United States Patent
Stefan et al.

(10) Patent No.: US 10,579,512 B2
(45) Date of Patent: Mar. 3, 2020

(54) METHOD AND APPARATUS FOR TESTING SOFTWARE FOR AUTONOMOUS VEHICLES

(71) Applicant: FORD GLOBAL TECHNOLOGIES, LLC, Dearborn, MI (US)

(72) Inventors: Frederic Stefan, Aachen (DE); Alain Marie Roger Chevalier, Henri-Chapelle (BE); Evangelos Bitsanis, Aachen (DE); Michael Marbaix, Haillot (BE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 180 days.

(21) Appl. No.: 15/340,889

(22) Filed: Nov. 1, 2016

(65) Prior Publication Data

US 2017/0132118 A1     May 11, 2017

(30) Foreign Application Priority Data

Nov. 6, 2015 (DE) .................. 10 2015 221 879

(51) Int. Cl.
*G06F 11/36* (2006.01)
*B60W 50/04* (2006.01)

(52) U.S. Cl.
CPC ......... *G06F 11/3684* (2013.01); *B60W 50/04* (2013.01); *G06F 11/3668* (2013.01); *G06F 11/3688* (2013.01)

(58) Field of Classification Search
CPC ............. G06F 11/3684; G06F 11/3668; G06F 11/3688; B60W 50/04

(Continued)

(56) References Cited

U.S. PATENT DOCUMENTS 6,336,079 B1 * 1/2002 Knestel ............... G01M 17/007
                                                         702/123
9,454,857 B2    9/2016 Pfister
(Continued)

FOREIGN PATENT DOCUMENTS

AT      511131 A2    9/2012
DE    19615008 A1   10/1997

OTHER PUBLICATIONS

Bock, T. et al., "Vehicle in the Loop Ein innovativer Ansatz zur Kopplung virtueller mit realer Erprobung", Jan. 2008, 8 pgs.

(Continued)

*Primary Examiner* — Lewis A Bullock, Jr.
*Assistant Examiner* — Theodore E Hebert
(74) *Attorney, Agent, or Firm* — Brooks Kushman P.C.; Frank MacKenzie

(57) ABSTRACT

A method and an apparatus for testing software for autonomous vehicles by means of a loop simulation involves hardware in the form of one or more real autonomous vehicles able to carry out autonomous test drives in the real world. In response to a work order given by a user, a check is automatically carried out in order to determine which vehicles, among a plurality of real autonomous vehicles which are able to carry out autonomous test drives on globally distributed test tracks in the real world, are currently available for one or more tests defined in the work order. The performance of the software tests and the test drives is then automatically planned and coordinated.

7 Claims, 1 Drawing Sheet

(58) Field of Classification Search
USPC .......................................................... 717/126
See application file for complete search history.

(56) References Cited

U.S. PATENT DOCUMENTS

| | | | | |
|---|---|---|---|---|
| 9,754,325 | B1* | 9/2017 | Konrardy | G06Q 40/08 |
| 2008/0028754 | A1* | 2/2008 | Tumati | F01N 3/032 |
| | | | | 60/297 |
| 2008/0275681 | A1* | 11/2008 | Langer | G01M 17/04 |
| | | | | 703/8 |
| 2014/0380264 | A1* | 12/2014 | Misra | G06F 8/00 |
| | | | | 717/100 |
| 2015/0149031 | A1* | 5/2015 | Pfister | G01M 17/007 |
| | | | | 701/33.4 |
| 2015/0262119 | A1* | 9/2015 | Santo, Jr. | G06Q 10/087 |
| | | | | 705/28 |
| 2016/0171133 | A1* | 6/2016 | Pfister | G01M 15/02 |
| | | | | 703/8 |
| 2017/0132118 | A1* | 5/2017 | Stefan | B60W 50/04 |

OTHER PUBLICATIONS

German Search Report dated Jun. 6, 2016 for German Application No. 102015221879.1, 4 pgs.

\* cited by examiner

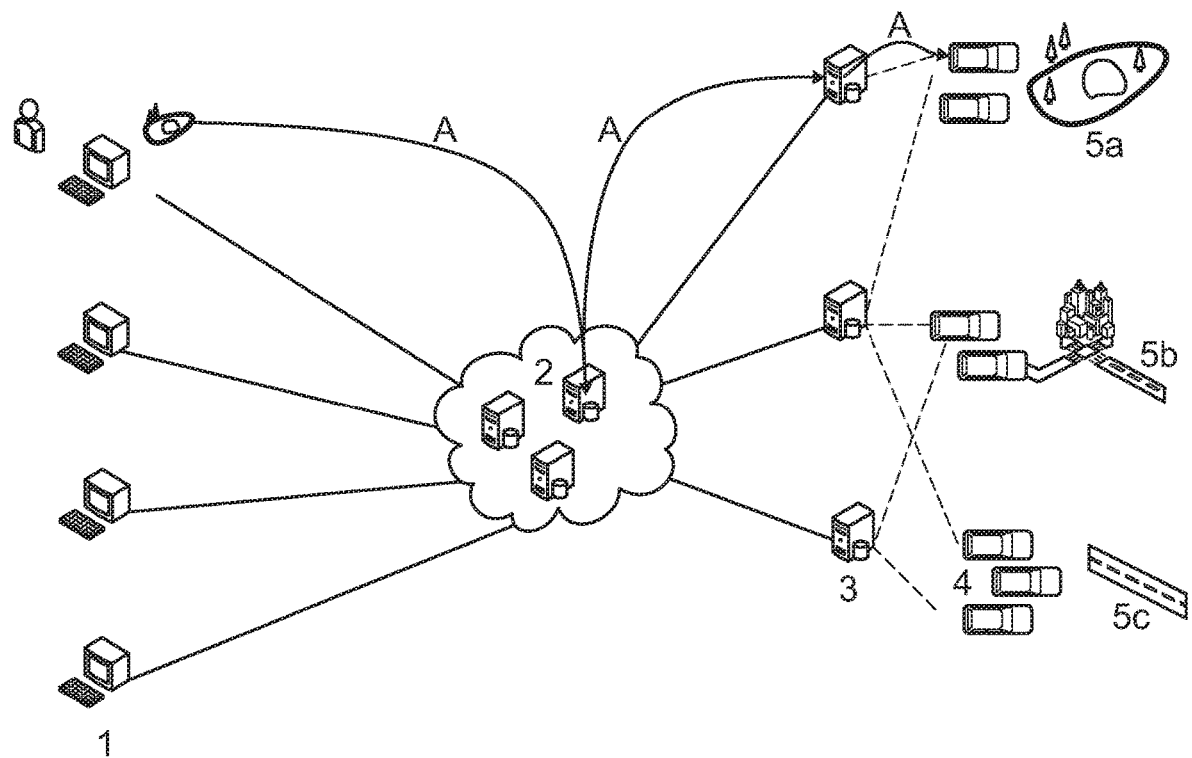

METHOD AND APPARATUS FOR TESTING SOFTWARE FOR AUTONOMOUS VEHICLES

CROSS-REFERENCE TO RELATED APPLICATIONS

This application claims foreign priority benefits under 35 U.S.C. § 119(a)-(d) to DE 10 2015 221 879.1 filed Nov. 6, 2015, which is hereby incorporated by reference in its entirety.

TECHNICAL FIELD

This disclosure relates to a device for testing autonomous vehicle software using autonomous vehicles.

BACKGROUND

Such a method and such an apparatus are known from the publication "Vehicle in the Loop" in the journal "Elektro-integration", ATZ January 2008, volume 110, pages 2-8. Said publication describes a test and simulation environment for driver assistance systems, in which a real test vehicle, which does not move in the public road traffic but rather in an open space or on a testing site, is combined with a driving simulator. Such a test structure, which is called "Vehicle in the Loop" can be used to safely test how driver assistance functions react to virtual external traffic or other virtual objects in a virtual traffic environment.

For software verification and validation at a system level, a set of stimuli and expected responses of the system are conventionally specified. The stimuli and expected responses are directly derived from corresponding requirements. The scope of these requirements, and therefore also the scope of the test cases, is generally restricted to a finite set of identified applications. The test cases are typically specified by test engineers using software test tools. Such tools may have functions for assisting with test automation and for enhancing the test maturity (version management, issue tracker, graphical test specification etc.).

SUMMARY

The disclosure is based on making it possible to verify and validate autonomous vehicles at a system level under conditions in the real world and, in particular, of providing a solution for restrictions, which may exist when particular prototype vehicles or test systems are available only in a particular geographical area.

According to the disclosure, in response to a work order given by a user, a check is automatically carried out in order to determine which vehicles, among a plurality of real autonomous vehicles that are able to carry out autonomous test drives on globally distributed test tracks in the real world, are currently available for one or more tests defined in the work order, and the performance of the software tests and the test drives is automatically planned and coordinated.

The method according to the disclosure is carried out in a system based on a network that comprises at least one client device, at least one cloud server and terminals, which comprise at least one simulation terminal, for example HiL devices, and at least one autonomous vehicle.

The disclosure makes it possible to expand existing global XiL frameworks (program frameworks) with the capability to simulate, validate and verify software for autonomous vehicles at system level and in a real environment in the world. A system set up to carry out the method according to the disclosure is able to command one or more autonomous vehicles throughout the world to carry out particular maneuvers on reserved test tracks and is also able to return the results of the test drive to an operator.

XiL is a standard for communication between test automation tools and test benches in the form of virtual environments for software verification. XiL assists test benches at all stages of the development and testing process, in particular MiL ("Model-in-the-Loop"), SiL (Software-in-the-Loop) and HiL (Hardware-in-the-Loop). The designation "XiL" thus indicates that the standard can be used for all possible "in-the-Loop" systems, in which case the simulation carried out in the system is referred to as a loop simulation herein.

In particular, the performance of the test drives can be planned and coordinated via a global data communication network, and a work order can comprise configuration instructions, environment instructions, operating instructions, data acquisition instructions and/or test condition and reporting instructions.

In one embodiment, in response to a work order given by a user, suitable autonomous vehicles and suitable test tracks in different testing facilities on different continents are automatically identified and booked, software tests are planned, software and test instructions are uploaded to simulation terminals belonging to the vehicles at a planned time, data are downloaded from the vehicles or simulation terminals during the tests and a test report can be generated after the tests have been concluded and can be transmitted to the user. The simulation terminals may be XiL or HiL devices, in particular.

BRIEF DESCRIPTION OF THE DRAWINGS

FIG. 1 shows an overview of a system for testing software for autonomous vehicles.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

With reference to FIG. 1, the system comprises a number of client devices 1 for defining and transmitting work orders, a number of cloud servers 2 for allocating, organizing and queueing the work orders, a number of simulation terminals 3, a number of fleets of autonomous vehicles 4, which may be at very different locations in the world, and a number of different road environments, for example extra-urban test tracks 5a, urban test tracks 5b and freeway test tracks 5c, on which one of the vehicles within the fleets of autonomous vehicles 4 is stationed for each case.

The client devices 1 make it possible for test engineers to define a set of work orders and to transmit said set of work orders to the system. A work order may consist of the following instructions:

Configuration instructions that describe the hardware (ECU, vehicle instrumentation, HiL characteristic data etc.) needed to process a work order and the calibration required for this hardware. It is conceivable for a plurality of autonomous vehicles 4 to be activated for a test, in which case only one vehicle 4 moves in the real world, for example, while one or more other vehicles 4 only simulate such journeys.

Environment instructions that describe a simulation environment in which the work order is intended to be processed. The simulation environment may be a road in the real world on a test track which is available on any testing site or in a dedicated test facility and includes a virtual version of the test track. The virtual version of the test track may also be automatically produced on the basis of characteristic features of roads in the real world. The environment may also be a particular reserved section of a public road.

Operating instructions that precisely describe the route intended to be followed by an autonomous vehicle 4 in the defined environment, for example starting point, end point, number of journeys; number of repetitions, distance etc. It is also possible to specify particular restrictions or events, for example speed restrictions, injection failures etc. It would also be possible to activate particular artifacts available on the environment road, for example a dummy crossing the road, spraying water on the road etc. In addition, the behavior of other road users with respect to a main test vehicle could be specified, for example overtaking maneuver, heavy braking of a vehicle traveling in front etc.

Data acquisition instructions that describe the set of information, for example CAN signals, internal signals, external video recordings etc., which is recorded while the work order is being processed.

Test condition and reporting instructions that describe test conditions complied by the system during the entire test, for example no deadlock situations, no collision, no moving outside particular ranges of values etc., and which are used when generating user-specific reports that summarize the result of the test at the end of the work order or at a particular interval of time during its processing.

The cloud server(s) 2 is/are one or more computer central processing units that process the work orders transmitted by the test engineers, namely for identifying and selecting a suitable set of globally available terminals. This activity comprises:

Configuring the terminals, for example flashing software and calibration, loading simulation environments etc.

Planning a simulation in a virtual environment in order to reduce the risk of incorrect configurations by the user and to reduce the risk of failure. This could relate to a vehicle in the test loop, in which case the entire vehicle is simulated by the simulation terminal without moving.

Planning a global simulation using the assigned autonomous vehicle(s) 4.

If the terminals cannot be remotely configured for some reason, the cloud server 2 should request the owner of the terminals to make the necessary adaptations.

The cloud server 2 also ensures the availability of the terminals for the duration of the test, for example by means of a queueing system.

The terminals to which the work orders are directed are typically pairs of simulation terminals 3, for example HiL devices and autonomous vehicles 4, a simulation terminal 3 being able to be installed in an autonomous vehicle 4 or stationed in the vicinity and connected to the vehicle 4 by radio. Both types of terminal can support the configuration and environment instructions specified in the work order. The simulation terminals 3 and the autonomous vehicles 4 are ideally equipped with interfaces that enable the remote configuration planned by the cloud server 2. The autonomous vehicles 4 should be close to a road environment that corresponds to the characteristic variables defined by the user.

For loop simulation, each simulation terminal 3 is best situated at the location of the autonomous vehicles 4 controlled by it. However, particular simulation terminals 3 may also be compatible with particular remote autonomous vehicles since it is conceivable for a vehicle in the loop simulation to be able to be controlled from a great distance.

The arrows A in FIG. 1 illustrate data communication connections between one of the client devices 1, the cloud server 2, simulation terminals 3 and autonomous vehicles 4. These data communication connections are used by a developer to transmit a work order to autonomously drive for 200 km on an extra-urban test track 5a as the road environment, for example, to the client device 1. Before a test drive is carried out in the real world by an autonomous vehicle 4 on the test track 5a, a simulation terminal 3 incorporates the autonomous vehicle 4 in the loop simulation.

The method for testing software for autonomous vehicles in global test frameworks is now described with reference to FIG. 1 and its explanation uses the example of a developer in Europe wishing to test new software for adaptive cruise control (ACC) in the state of free-flowing freeway traffic. An ACC system is a cruise control system which can be used by a vehicle to automatically keep its speed constant or else to automatically reduce it if a vehicle traveling in front is detected on the road and is then followed by the vehicle with an adapted speed.

The Following Tests Need to be Carried Out:

Response of the test vehicle to a changed target value for the vehicle speed.

Testing that the distance to a vehicle traveling in front is complied with.

Test response in the case of another vehicle going back into the lane.

The developer in Europe specifies the following data on the client device 1:

Configuration Instructions:

A host vehicle is needed to test the ACC system. The vehicle should have a special controller on board which is able to communicate with the engine control module and with some sensors, for example Lidar, camera, radar etc. It should be possible to flash the ACC software onto this controller. It should also be possible to transmit driving instructions to the autonomous vehicle by means of programming.

A second autonomous vehicle is needed to test interactions with the vehicle to be tested. It should be possible to transmit driving instructions to the second vehicle by means of programming. It should also be possible for a human person to transmit driving instructions to the second vehicle.

Environment Instructions:

A testing site with a test track similar to a freeway is needed, that is to say a long road of good road quality, which is straight or has large curve radii, thus allowing fast driving.

Operating Instructions:

Test 1:

Start the host vehicle.

Have the host vehicle drive at 80 km/h and follow the road.

Activate the ACC system to be tested with a target speed of 120 km/h.

Wait until a particular time has elapsed.

Reduce the ACC target speed in steps of 5 km/h per minute to 0 km/h.

Have the host vehicle return to the starting point and switch off its drive motor.

Test 2:

Start the second vehicle.

Have the second vehicle drive at 80 km/h and follow the road.

Start the host vehicle.

Have the host vehicle drive at 80 km/h and follow the road two minutes later.

Activate the ACC system to be tested with a target speed of 120 km/h and a target distance of 100 m to a vehicle traveling in front.

Change the distance to the vehicle traveling in front in different steps.

Have the two vehicles return to the starting point after a particular distance and switch off their drive motors.

Test 3:

Start the host vehicle.

Have the host vehicle drive at 80 km/h and follow the road.

Activate the ACC system to be tested with a target speed of 120 km/h and a target distance of 100 m to a vehicle traveling in front.

Start the second vehicle two minutes later and have it drive at 140 km/h.

Have the second vehicle overtake the host vehicle and carry out a maneuver of going back into the lane at a particular distance from the host vehicle.

Test a plurality of maneuvers of going back into the lane at different distances.

Have the two vehicles return to the starting point and switch off their drive motors.

Data Acquisition Instructions:

All signals available from the host vehicle and from the second vehicle are intended to be recorded and to be transmitted to a cloud server 2 with particular identifiers.

Test Condition and Reporting Instructions:

Inform the developer of the test plan and transmit reporting data after the test has been carried out.

Define the following test conditions which should be automatically included in the report:

For test 1, check that the vehicle target speed has been reached within the time specified in the ACC feature attributes.

For test 2, check that the distance to the vehicle traveling in front has been complied with within the tolerance specified in the ACC feature attributes.

For test 3, check that the ACC software has recognized the situation in which a vehicle gets back into a lane and that a braking command has been given.

As soon as the instructions have been defined, the developer transmits them to a cloud server 2.

The cloud server 2 analyzes the instructions transmitted by the developer and carries out the following activities:

The cloud server 2 identifies suitable vehicles on different testing sites in Europe, Asia and America.

The cloud server 2 identifies only suitable test tracks in Asia and America.

The cloud server 2 determines that the test tracks in America are being used intensively for other tests; therefore, the test track in Asia and the corresponding vehicles are used.

The cloud server 2 plans the test, books the vehicles and the test track in Asia for the duration of the test and informs the local persons responsible.

At the planned time, the cloud server 2 uploads the necessary software and test instructions to the test vehicles in Asia.

During the test, the cloud server 2 downloads data from the vehicles and, when the test has been concluded, the cloud server 2 plans the generation of the test report, which may be carried out by an external system. The cloud server 2 finally informs the developer that the test has been concluded and transmits the test report to the developer.

Terminals:

In this example, two test vehicles are in Asia: the host vehicle and the second vehicle.

The ACC software is flashed onto the host vehicle or the associated simulation terminal by means of the cloud server 2.

Each vehicle first of all receives the instruction to make its way to the correct test track at the correct time.

The test instructions for test 1, test 2 and test 3 are stored in each vehicle, for example in a dedicated memory.

Each vehicle then carries out its instructions at the correct time, for example to start, to drive at 80 km/h, etc.

The disclosure generally provides methods and algorithms for automatically planning and coordinating the performance of test drives by autonomous vehicles. The methods are based on a global network that may comprise at least one client device, at least one cloud server and terminals, the terminals comprising at least one simulation terminal and at least one autonomous vehicle. The methods are also based on the ability to record information relating to the test drives and their results.

Methods and algorithms are also hereby provided, which methods and algorithms make it possible for a development engineer to define work orders, which may comprise configuration instructions (what should be done), environment instructions (where it should be done), operating instructions (how it should be done), data acquisition instructions (which data should be collected) and/or test condition and reporting instructions (reporting results), on a client device and to transmit said work orders.

Methods and algorithms are also hereby provided in order to process work orders which have been transmitted by different client devices, in which case the processing may comprise identifying the correct terminals, planning the orders to be carried out by suitable terminals, queueing orders for the suitable terminals and feedback for the client device. The processing may also comprise a validation phase on the basis of a simulation before the actual operation of an autonomous vehicle in order to ensure that the operating procedure is valid or plausible. The processing can be carried out by cloud servers or similar devices.

Methods and algorithms are also hereby provided in order to stipulate terminals which are a collection of XiL devices and autonomous vehicles which may be situated at suitable locations throughout the world and are able to carry out the work orders. The XiL devices may be used as a preparatory validation environment in order to ensure that the autonomous vehicle will be operated correctly. This can be effected by simulating the orders in a virtual environment, a "Vehicle in the Loop" environment etc. The autonomous vehicle stipulated must match the XiL devices in terms of its equipment and must be at a location where the test can be carried out, for example in a suitable test facility.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An apparatus for testing software for autonomous vehicles comprising:
   a client device configured to transmit a work order for autonomous test drives, the work order including configuration instructions that describe hardware and calibration, environment instructions that describe an environment including an extra-urban environment, an urban environment, and a highway environment, and operating instructions that describe a route to be followed in each environment;
   a cloud server, in cooperation with a global data communication network, configured to process the work order to select an autonomous vehicle from a set of globally available autonomous vehicles, plan the autonomous test drives, book the autonomous vehicle selected from the set of globally available autonomous vehicles, and book a test track located in proximity of the autonomous vehicle for a duration of the autonomous test drives;
   wherein the global data communication network is configured to plan and coordinate the test drives such that autonomous vehicles and test tracks in different testing facilities on different continents are booked for the work order; and
   a simulation terminal in communication with an autonomous vehicle having an interface that enables a remote configuration planned by the cloud server and defined by the work order such that the autonomous vehicle performs the test drives defined by the work order, wherein a test report is output to the client device.

2. The apparatus as claimed in claim 1, wherein the cloud server is configured to upload the work order to the autonomous vehicle at a planned time.

3. The apparatus as claimed in claim 1, wherein the cloud server is configured to download data from the autonomous vehicle during the tests and generate the test report.

4. The apparatus as claimed in claim 1, wherein the work order for the tests is stored in the autonomous vehicle in a dedicated memory.

5. A method for testing software for autonomous vehicles comprising:
   in response to a work order for autonomous test drives including configuration instructions that describe hardware needed to process the work order, calibration required for the hardware, environment instructions that describe at least one of a simulation environment and a real environment including at least an extra-urban test track, an urban test track, and a freeway test track in which the autonomous test drives are to be processed, and operating instructions that describe a route to be followed by the autonomous vehicle in the simulation environment and/or the real environment input to a client device, checking for autonomous vehicles, via a cloud server, remotely configured to perform the autonomous test drives defined by the work order at globally distributed test tracks, each having at least one autonomous vehicle and an associated simulation terminal;
   planning, via the cloud server over a global data communication network, a performance of the autonomous test drives such that autonomous vehicles and test tracks in different testing facilities on different continents are booked for the duration of the autonomous test drives;
   coordinating, via the simulation terminal, the performance of at least one of the autonomous test drives; and
   generating a report of the performance of the autonomous test drives to the client device.

6. The method as claimed in claim 5, wherein the work order includes data acquisition instructions that describe a set of information recorded while the work order is being processed.

7. The method as claimed in claim 5, wherein the work order includes test conditions and reporting instructions that describe the test conditions during the autonomous test drives, further comprising outputting the report to summarize the result of the autonomous test drives according to the test conditions and the reporting instructions.

* * * * *